(12) United States Patent
Boccuzzi et al.

(10) Patent No.: US 6,731,697 B1
(45) Date of Patent: May 4, 2004

(54) SYMBOL TIMING RECOVERY METHOD FOR LOW RESOLUTION MULTIPLE AMPLITUDE SIGNALS

(75) Inventors: Joseph Boccuzzi, Staten Island, NY (US); Kevin Hwang, Sunnyvale, CA (US); Roopa Rao, Santa Clara, CA (US)

(73) Assignee: Cadence Desicgn Systems, Inc., San Jose, CA (US)

( * ) Notice: Subject to any disclaimer, the term of this patent is extended or adjusted under 35 U.S.C. 154(b) by 0 days.

(21) Appl. No.: 09/680,909

(22) Filed: Oct. 6, 2000

(51) Int. Cl.[7] .................. H04L 7/00; H04L 25/36; H04L 27/22; H03D 1/00
(52) U.S. Cl. ........................ 375/326; 375/355
(58) Field of Search ................. 375/326, 340, 375/346, 348, 355, 371, 320, 321, 342, 373, 375, 376, 327; 382/168, 170, 172, 199

(56) References Cited

U.S. PATENT DOCUMENTS

| | | | |
|---|---|---|---|
| 4,941,155 A | * 7/1990 | Chuang et al. | 375/84 |
| 5,079,771 A | 1/1992 | Shimada | |
| 5,418,789 A | * 5/1995 | Gersbach et al. | 371/5.2 |
| 5,511,099 A | * 4/1996 | Ko et al. | 375/368 |
| 5,872,818 A | 2/1999 | Choi | |
| 5,914,985 A | * 6/1999 | Ishizu | 375/326 |
| 5,966,188 A | * 10/1999 | Patel et al. | 348/726 |
| 6,128,357 A | * 10/2000 | Lu et al. | 375/355 |
| 6,154,510 A | 11/2000 | Cochran et al. | |
| 6,175,600 B1 | * 1/2001 | Guillemain et al. | 375/326 |
| 6,314,129 B1 | * 11/2001 | Sunwoo et al. | 375/149 |

OTHER PUBLICATIONS

Martin S. Roden, "Analog and Digital Communication Systems", ISBN 0-13-032822-7, Prentice Hall, Inc., pp. 397-398.*

* cited by examiner

*Primary Examiner*—Mohammad H. Ghayour
*Assistant Examiner*—Dung X. Nguyen
(74) *Attorney, Agent, or Firm*—John W. Carpenter; Reed Smith LLP

(57) ABSTRACT

Symbol timing is performed by providing a histogram of samples of a signal for a predetermined number of symbol times. An average, weighted average, or other method is applied to determine an average timing for a max eye opening for each symbol time. The average max eye opening timing is applied to an edge detection of a currently received signal to determine timing of a sample that is most likely to occur closest to the max eye opening for the current symbol. The invention may also be practiced based on a center timing of each symbol.

19 Claims, 15 Drawing Sheets

(2 Symbols Shown)

SYMBOL TIMING RECOVERY METHOD FOR LOW RESOLUTION MULTIPLE AMPLITUDE SIGNALS

BACKGROUND OF THE INVENTION

1. Field of Invention

This invention relates to recovery of symbol timing of a signal received in a digital communication system. The invention is more particularly related to the detection of symbol edges for use in symbol timing recovery of low resolution digital signals encoded in an analog received signal.

2. Discussion of Background

In general digital communication systems, a transmitting apparatus modulates a digital signal (1) by any known modulation techniques (Quadrature Amplitude Modulation (QAM), or Quadrature Phase Shift Keying (QPSK), for example). The modulation technique converts the digital signal into an analog signal for transmission. A receiver of the analog modulated signal demodulates the signal and converts it into a digital signal, restoring it to the original form (digital signal (1)).

Many modulation and demodulation techniques are know that are capable of accurately restoring the received signals into original digital signals (also referred to as symbol values) when the received signals are sampled at the same interval of time (frequency) and symbol starting point (phase) as those of the symbols transmitted from the transmitter. Without proper frequency and phase alignment in the receiver (Rx), increased computations are required to maintain accuracy of the digital signal restoration, or additional errors are encountered (increasing a bit error rate (BER) of the communications system in general, and the receiver in particular). Therefore, one of the important processes that occur in the receiver of the digital communication system is to accurately restore a symbol timing (frequency and phase) representing a point in time that the received signal should be sampled.

In some systems, a specific carrier corresponding to a sampling frequency is transmitted, providing frequency and phase for the sampling. However, many modern systems do not provide a carrier, and it is therefore important to accurately recover a symbol timing using only the received signal. With the proliferation of digital communication systems, there has been an increased need for improved and distinctive symbol timing recover (STR) processes within receivers of digital communications. A conventional apparatus for recovering a symbol timing is shown in FIG. 1.

In FIG. 1, a received signal is input to an analog-to-digital (A/D) converter 100. The A/D converter 100 samples the input signal at a frequency supplied from a voltage controlled oscillator (VCO) 110 and converts the analog signal into a digital signal. The digitized signal is output via a matching filter 120, and simultaneously input to a timing error detector 130. The timing error detector 130 detects a symbol timing error from the input signal and outputs a detected error value, to a loop filter 140. The loop filter 140 filters the input signal to remove various noises. The VCO 110 oscillates at a frequency according to the output of the loop filter 140 and supplies the oscillated frequency signal to the A/D converter 100.

However, in conventional systems, receiver (Rx) and transmitter (Tx) inaccuracies, operating conditions, and other reasons can cause symbol timing drift that results in the number of symbols transmitted from the transmitter differs or has significantly different timing from that of the restored signals. For example, one reason is because the receiver does not know when the symbols will arrive, which can be due to a number of factors, including propagation delay between the Tx and Rx, particularly in a wireless communication environment where distances may become large. Another reason is that the transmitter and receiver clocks drift from their nominal values, forcing the receiver to continually adjust (or adapt) to maintain the appropriate sample time instance. By appropriate, it is desired that the sampling time instance match (or closely match) a maximum eye opening of the received signal, since this timing epoch corresponds to a maximum signal to noise ratio (SNR) value of the received signal.

One common method for continually adjusting to maintain the appropriate sample time instance is known as matched filter technique, which is illustrated in FIG. 2. In FIG. 2, a fixed oscillator 200 generates a constant frequency signal and supplies the same to an A/D converter 210. The A/D converter 210 converts the received signal into a digital signal using the frequency signal supplied from the fixed oscillator 200, and outputs the digitized signal to an interpolator 220. Meanwhile, a controller 230 receives a symbol timing error signal output from a timing error detector 250 via a loop filter 240. The controller 230 generates an interpolation coefficient according to the input symbol timing error signal and supplies the same to the interpolator 220. The interpolator 220 interpolates the digitized signal with the interpolation coefficient supplied from the controller 230, and outputs the interpolated result to a matching filter 260.

The A/D converter 210 samples the received signal at a sampling frequency supplied from the fixed oscillator 200 and converts the analog signal to the digital signal. The digitized signal is output via the interpolator 220 and the matching filter 260 and simultaneously input to the timing error detector 250. The symbol timing error signal which is detected in the timing error detector 250 and has noise removed in the loop filter 240 is then input to the controller 230. The controller 230 generates the interpolation coefficient according to the input signal. The interpolator 220 interpolates the digitized signal according to the interpolation coefficient supplied from the controller 230, and thereby removes the symbol timing error. Although this apparatus can accurately recover the symbol timing, it is very complicated to implement using hardware.

Other efforts at providing the needed symbol timing recovery include Choi, U.S. Pat. No. 5,872,818, which is incorporated herein by reference, in it's entirety. Furthermore, in addition to Choi and the Matched Filter described above, many other techniques are available, such as Maximum Likelihood (ML), PLL-Based systems, DFT.

However, none of these techniques provide the best solution for modern digital communications devices. Moreover, the above techniques favor high resolution received signals. In this application, resolution refers to discrete time representations of a continuous signal. High resolution refers to a relatively large amount of bits in the ADC. For example, a number of bits (b), such as $b \geq 6$, are considered high resolution.

SUMMARY OF THE INVENTION

The present inventors have realized that modern digital communications systems fail to address the needs of applications of low resolution digital systems.

The present invention provides a robust method with good BER performance for low resolution signals. The present invention can be implemented without the complexities seen in the prior art, and can be modified for improved performance when high resolution signals are available.

Roughly described, the present invention provides Symbol Timing Recovery (STR) via a set of edge detections maintained in a histogram that are utilized to calculate the phase and timing of subsequently received symbols.

The present invention is embodied as a device, comprising, an ADC mechanism configured to sample a received signal at a predetermined over-sampling rate, a detector connected to said ADC mechanism and configured to detect a symbol identified by at least one of said samples during predetermined symbol times, and a symbol timing mechanism connected to said ADC mechanism and said detector and configured to read said samples and adjust a timing of the detection performed by said detector based on previously read samples so that the detected samples are at a most likely maximum eye opening of said samples during said predetermined symbol times.

The present invention includes a method of symbol timing, or recovery of symbol timing, comprising the steps of, sampling a received signal at a predetermined over-sampling rate, determining a timing for detection of a specific one or set of said samples based on historical data of samples previous samples, and detecting said specific one or predetermined number of samples based on the determined timing.

Both the device and method may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In a digital communications system, a number of bits used in the Analog to Digital Converter (ADC) comprises a tradeoff between power consumption, board real estate, and performance. In the present invention, low resolution signals are targeted (for example, signals used in pagers). An example low-resolution system would, for example, choose b=2 bits for the ADC and 4-level baseband signals (low frequency content signals with discrete amplitude levels and carrier removed, for example).

Figure 1:
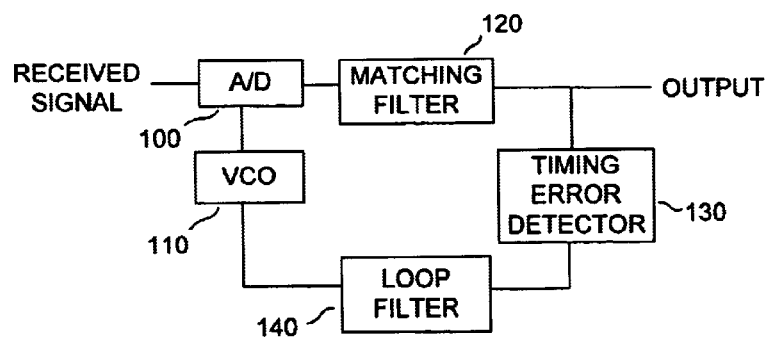
FIG. 1 is conventional apparatus for recovering a symbol timing.
Figure 2:
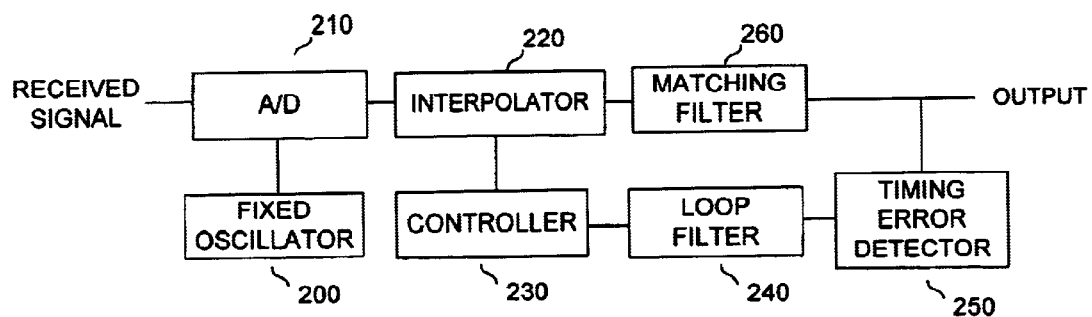
FIG. 2 is a block diagram illustrating a conventional matched filter technique for continually adjusting to maintain an appropriate sample time instance.
Figure 3:
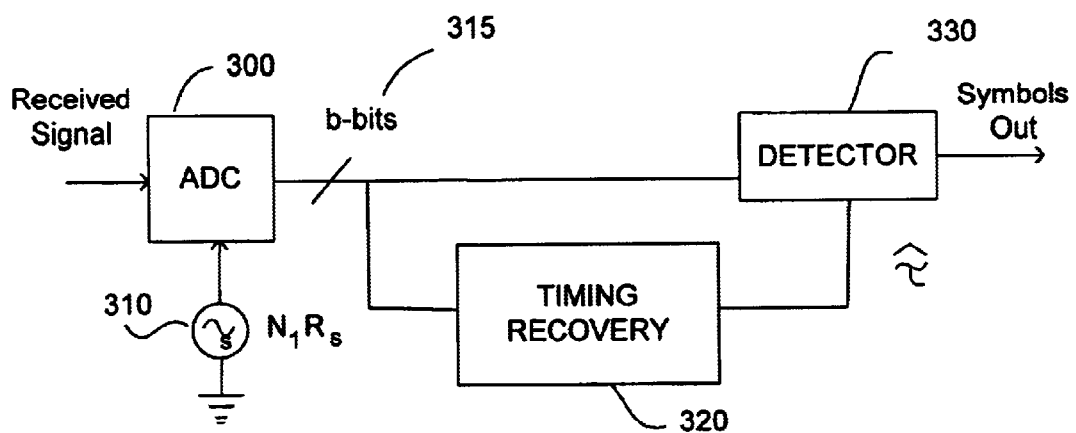
FIG. 3 is a block diagram illustrating the Symbol Timing Recover section in a digital receiver.

Referring again to the drawings, wherein like reference numerals designate identical or corresponding parts, and more particularly to FIG. 3 thereof, there is illustrated a block diagram illustrating the Symbol Timing Recover section in a digital receiver. A received signal is fed to an ADC 300 which is timed via an oscillator 310. The digitally converted signals b-bits 315 are fed to a timing recovery module 320 and a detector 330. The timing recovery module 320 identifies the symbol edge and adjusts the phase of detector 330 such that the detector 330 recognizes the symbol at an amplitude sufficient to recover a bit value previously represented in the received signal. The recovered bits, or symbols, are output.

Figure 4A:
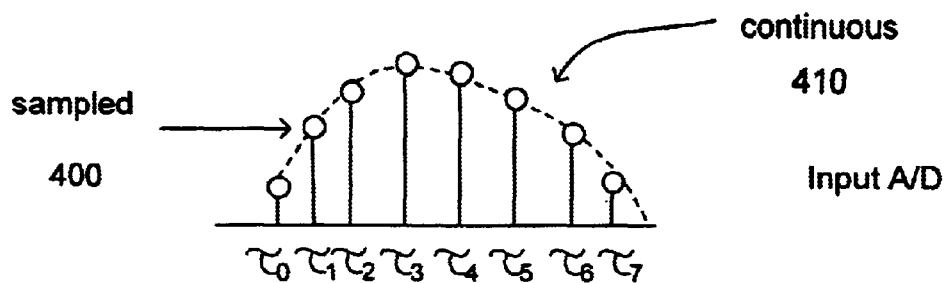
FIG. 4A is a graph illustrating a waveform of a digitally sampled continuous analog signal.

FIG. 4A is a graph illustrating a waveform of a digitally sampled continuous analog signal (for 8× over-sampling). In this example, over-sampling is the number of digital bits converted from the received signal for a length of time equivalent to a period of a single bit in the digital waveform to be recovered. Thus, FIG. 4A shows 8 samples, at times $y_0$, $y_1$, $y_2$, $y_3$, $y_4$, $y_5$, $y_6$, and $y_7$, each provided by the ADC, from which a symbol is to be recovered. For the eye diagram of FIG. 4A, the detector would want to detect the symbol at $t=y_3$ because $y_3$ represents the time at which the eye is at maximum (greatest amplitude of the symbol to be recovered).

When using a matched filter approach, each digitally sampled waveform (FIG. 4A, or 4B, for example) is compared to a stored waveform that represents (or "looks" like) a waveform that is expected to be received. Each sampled waveform is compared, and a stored waveform having the highest correlation to the sampled waveform is chosen for output.

Figure 4B:
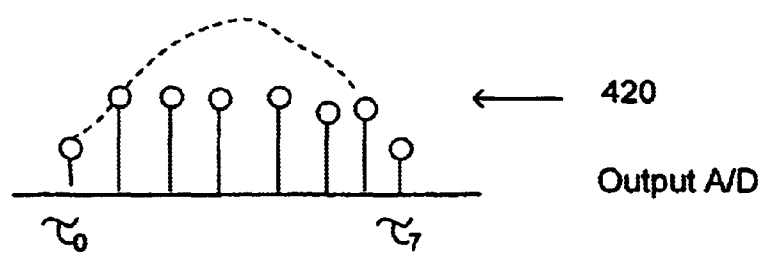
FIG. 4B is a graph illustrating a waveform of a digitally sampled low resolution continuous analog signal.

FIG. 4B is a graph illustrating a waveform of a digitally sampled low resolution continuous analog signal (for 8× over-sampling). The digitally sampled signal shows a flattening effect 420. The lost information (additional amplitude at the sample points missing due to low resolution) makes matching more difficult because less variance between signals makes each signal have less correlation to the stored waveforms.

Therefore, it can be seen that the matched filter technique works well with high resolution signals. However, with low resolution signals, performance is degraded because much of the information contained in the signal is lost due to resolution reduction.

Figure 5:
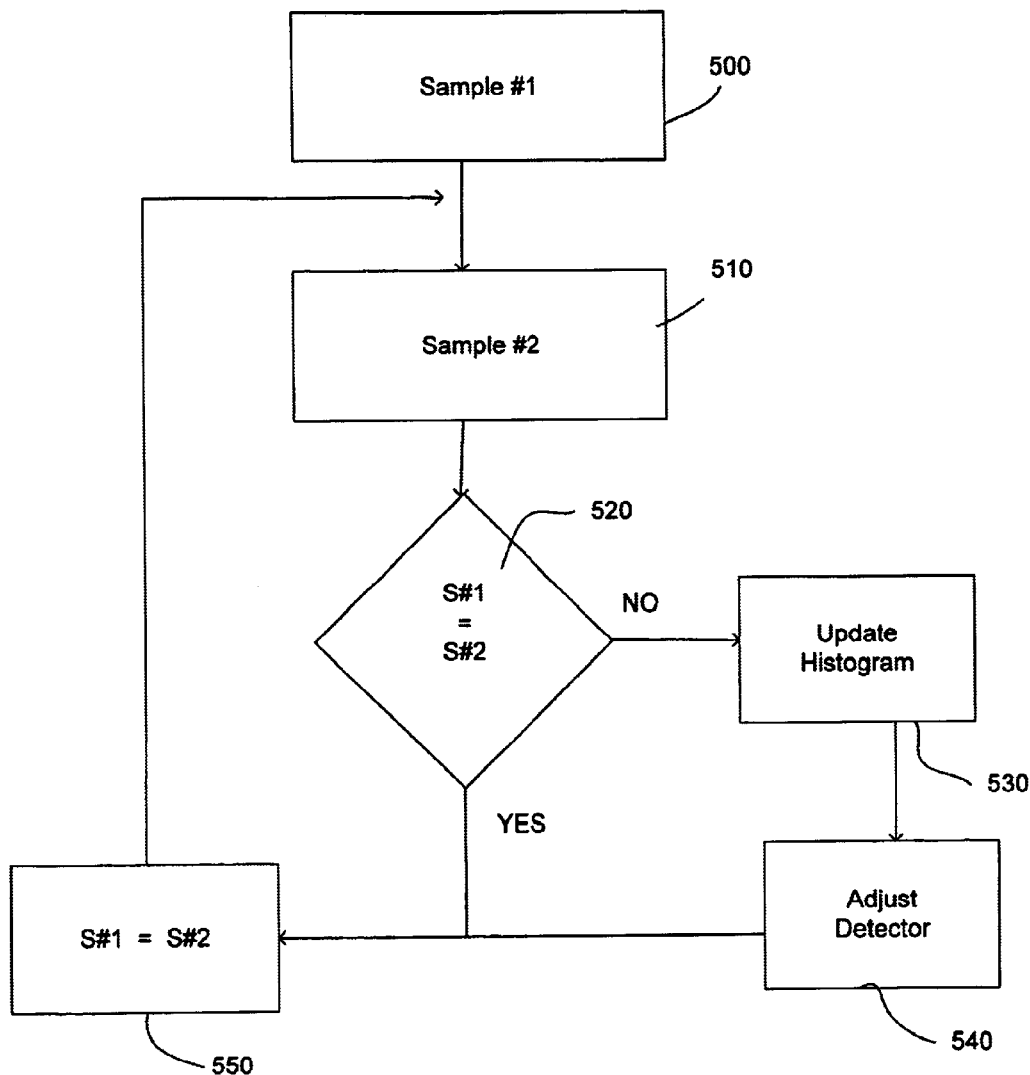
FIG. 5 is a flow chart illustrating a detector adjustment process according to the present invention.

The present invention observes symbol (or bit) edges in the received digitally sampled signal, and develops a histogram (normalized histogram, or probability density function, normalized by the total number of events, for example) of the boundaries of each symbol. FIG. 5 is a flow diagram that shows the basic process. At step 500, a sample is taken (MSB, for example). At step 510 a second MSB sample is taken. The samples (MSB's in this example) are compared to determine if a transition has occurred (step 520). A transition is detected by determining if Sample 1 (S1) and Sample 2 (S2) are different (different samples indicates a transition, equivalent, or roughly equivalent samples indicate no transition).

The detection information is used to develop a histogram that identifies timing and recovery of past edges or transitions of the sampled received signal. With each transition, the histogram is updated (step 530). The histogram is utilized to adjust the detector (step 540). The detector can be adjusted to any of edge, center, or other portions (¼, for example) of the incoming symbols, depending on the type of detector used. To finish the loop, S1 is substituted with S1 and the loop continues (step 550). Variations of the flow illustrated in FIG. 5 can be made based on the present disclosure.

Figure 6:
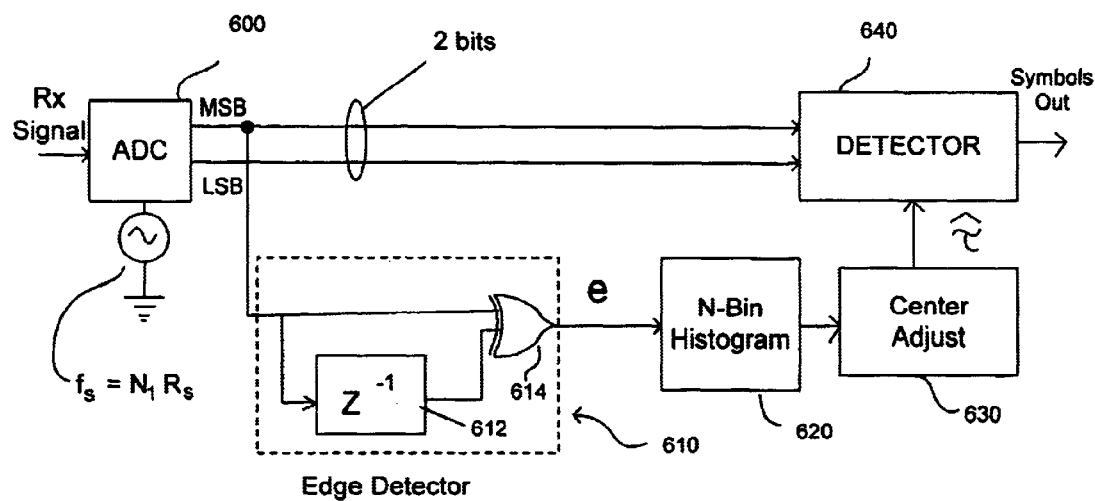
FIG. 6 is a block diagram of a symbol edge detection device according to one embodiment of the present invention.

FIG. 6 illustrates a block diagram of a symbol edge detection device according to one embodiment of the present invention. In FIG. 6, ADC 600 provides an MSB and a LSB recovered by sampling of a received signal (b=2).

An edge detector 610 compares adjacent MSB samples. The edge detector 610, in this example, is constructed from a delay circuit 612 and an exclusive or circuit device 614. Alternatively, the edge detector may be constructed from other configurations of parts, including, for example, a delay circuit and a comparator. What is important is that the edge detector is capable of determining a transition of the MSB (or other sampled bit). The edge detected (e) is then fed to an N-bin histogram 620. In one embodiment, the n-bin histogram 620 is constructed of a memory device that maintains a history of timing for each edge detected. In another embodiment, one or more averages of edge detectors are calculated and stored.

A detector 640 detects a bit in the sampled received signal at a point that is most likely to be the highest amplitude of the bit being recovered from the received signal. A center adjust device 630 utilizes the histogram 620 to determine the point where the highest amplitude occurs based on previous edge detections. For example, if the last n edge detections each came in at a same time instance interval, that same interval would be the most likely next edge and the most likely point of highest amplitude would be calculated based on that interval. Using specific values, if each symbol is received in 0.25 ms intervals, the next highest amplitude point could be calculated at 0.25 ms+Ts/2, where Ts=the timing period of the received bits.

In other words, the edge detector compares adjacent MSB samples. If the adjacent samples are the same, then e=0; which indicates that a transition has not occurred. If the adjacent samples are different, then e=1; indicating that an edge has been detected. When an edge is found, the time instances (time samples from where the edge was found) are distributed into the N-bin histogram 620. In one embodiment, N=8 represents the over-sampling ratio of the ADC (the number of samples per bit or symbol).

Thus, statistics for an edge detection are gathered. The statistics are accumulated for a predetermined number of Symbols M (M=40, for example). Using the accumulated statistics, a most likely (ML) position of a symbol edge can be determined. For example, given a set of accumulated statistics, and assuming an eye that is at least somewhat symmetrical, the center adjustment is made such that eye is assumed to be at a detected edge, plus Ts/2, Ts being the symbol time (period of the symbols being decoded). Ts is calculated based on the histogram data. Ts is calculated using any method, peak-to-peak, for example. Ts, generally being constant, is known ahead of time. However, it is not known where in the histogram the peaks or Ts will fall. In addition, other factors affect timing and placement of Ts, such as propagation time delay, frequency drift of transmitter/receiver, interference, etc. Ts may equal T, or be some multiple or fraction thereof (0.9 T, 1.1 T, for example).

Figure 7:
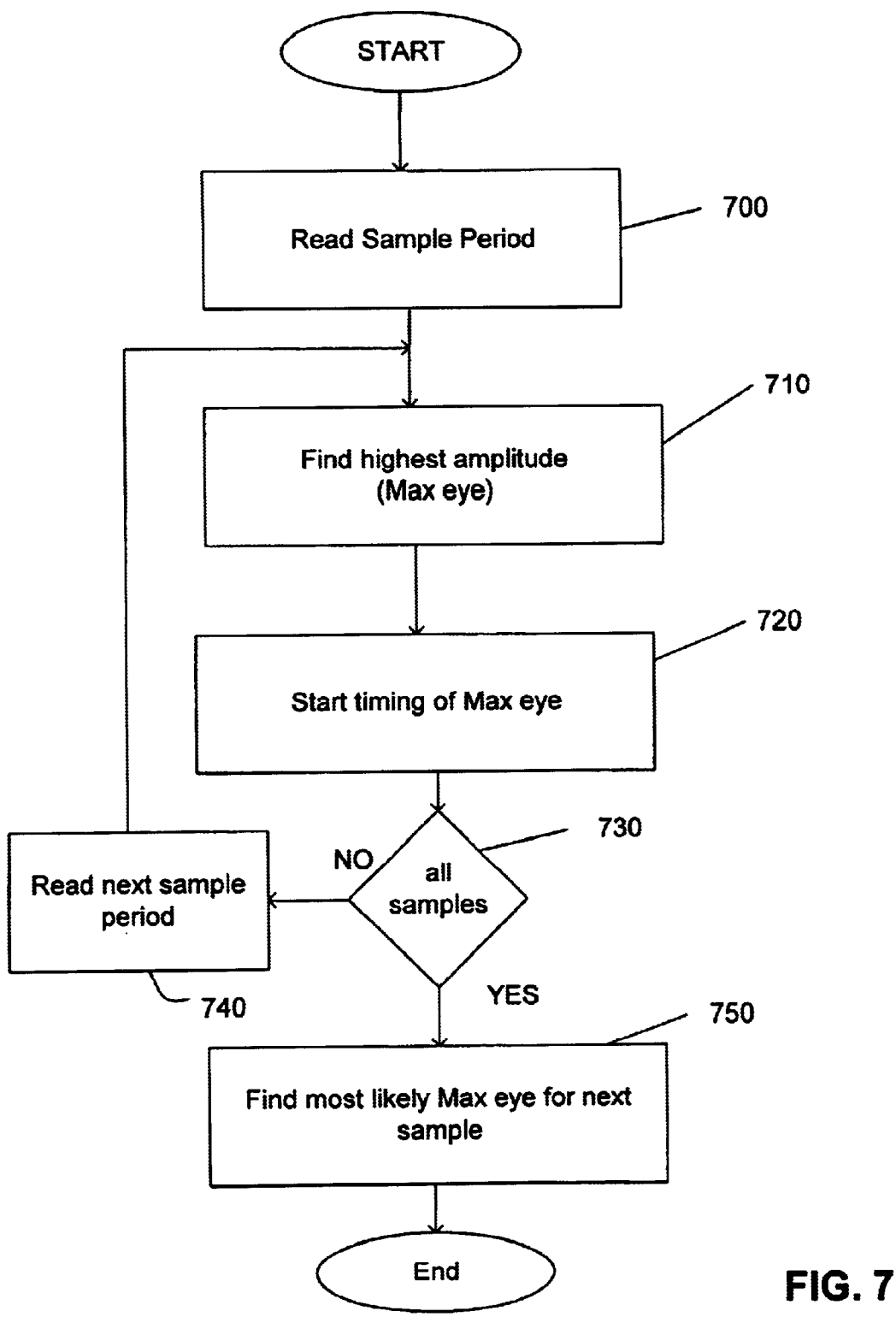
FIG. 7 is a flow chart illustrating one embodiment of a process for utilizing histogram data for determining a most likely eye opening for a next symbol time.

The histogram may be constructed and maintained in many different ways. What is important is that a timing of a most likely max eye opening either be maintained or be derivable from data stored in the histogram. For example, FIG. 7 provides a flow chart of one embodiment of a process for using histogram data storing the timing of a max eye opening for each set of samples for each symbol time. At step 700, the samples from a sample period are read. The read samples are compared to determine the max eye opening (highest amplitude, for example) (step 710). A timing of the max eye opening from an edge detection of the symbol time to the max eye opining is stored in the histogram (step 720) (max eye opening). If all the stored samples are not yet read, samples from another period (symbol time) are read and the process repeats (step 740). If all the stored samples are read, an average or other method is utilized to determine a most likely max eye opening for a next symbol time (step 750). The most likely max eye opening for the next symbol time is then added to the timing of an edge detection of the next symbol time to provide a timing for the detector to detect the symbol value.

Figure 8:
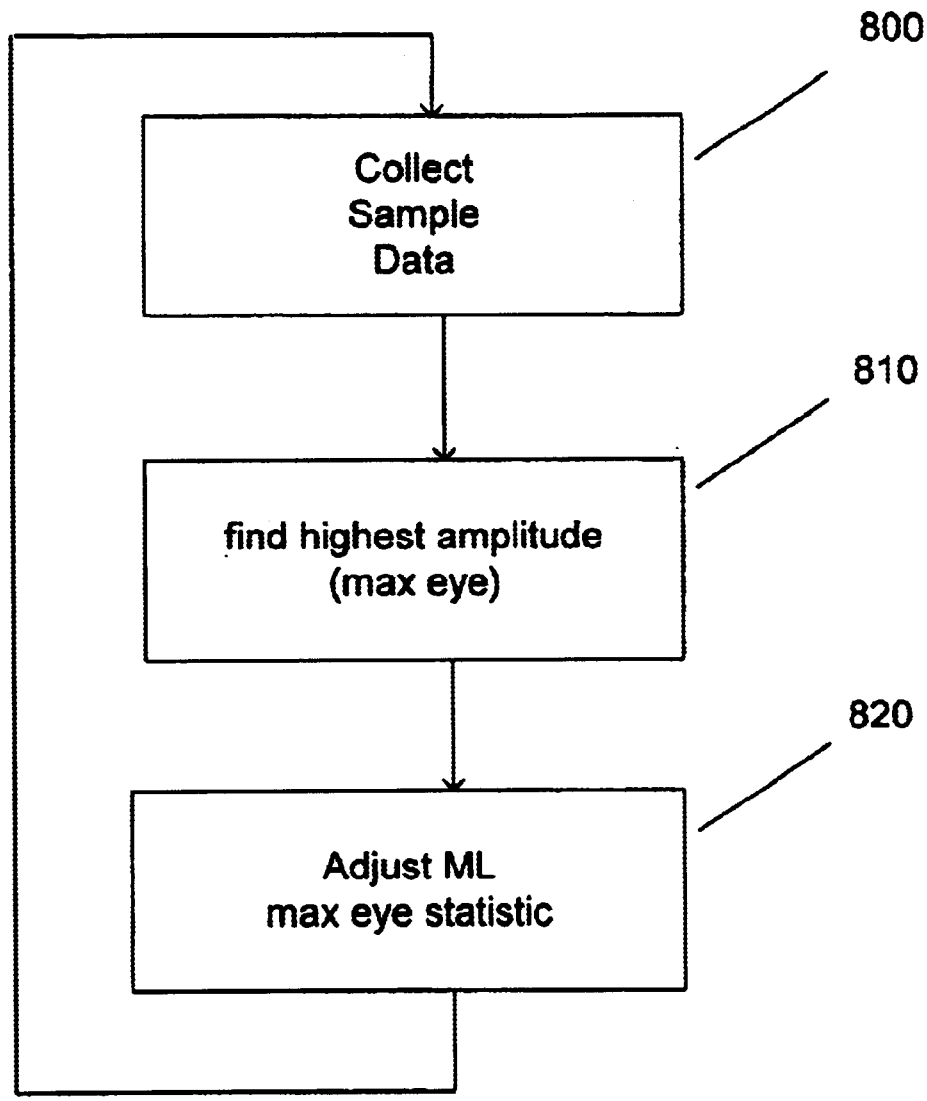
FIG. 8 is a flow chart illustrating one embodiment of maintaining a running average of timing for a most likely max eye opening of a next symbol time.

Other histogram configurations and processes may be utilized to determine the detection timing. FIG. 8 illustrates another embodiment where a running average of max eye opening timing relative to edge detection is maintained. At step 800 sample data is collected for a symbol time of a received signal. The collected sample data is analyzed to determine a timing of the max eye opening of the collected sample data symbol time (step 810). A running average or other statistic representing a most likely max eye opening for a next symbol time is then adjusted based on the max eye opening timing of the collected sample data (step 820). The running average is then applied to the edge detection of the next symbol time to provide a detection timing for the symbol.

Figure 9:
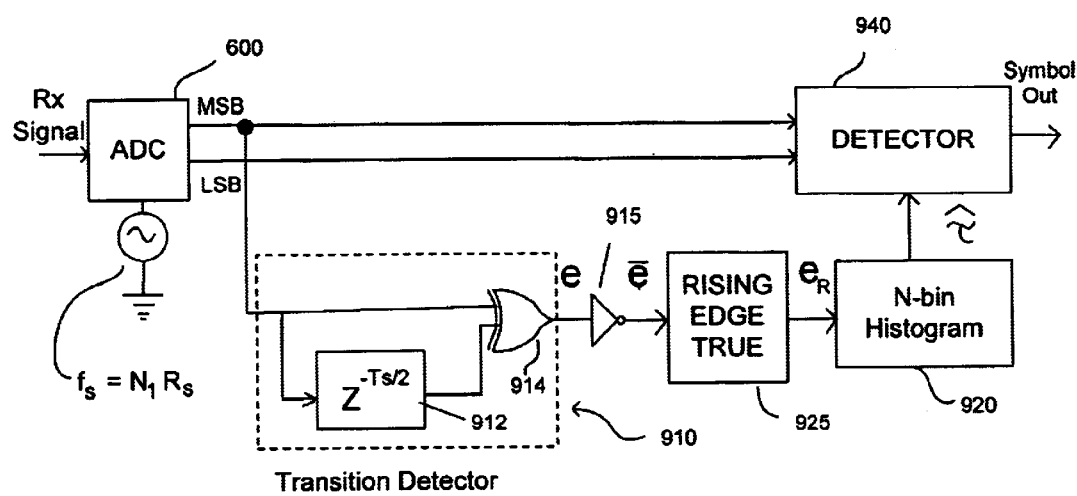
FIG. 9 is a block diagram of a symbol center value detection device according to another embodiment of the present invention.

FIG. 9 illustrates a block diagram of another embodiment of the present invention. In this embodiment, a symbol center value is determined. ADC 600 provides an MSB and a LSB recovered by sampling of a received signal (b=2). A transition detector 910 compares adjacent MSB samples. The transition detector 910, in this embodiment, is constructed from a delay circuit 912 and an exclusive or circuit device 914. Alternatively, the transition detector may be constructed from other configurations of parts, including, for example, a delay circuit and a comparator. What is important is that the edge detector is capable of determining a transition of the MSB (or other sampled bit) (an edge triggered device, for example, outputting a fixed value when the input goes from zero to high, and outputting zero when the input falls).

Figure 10:
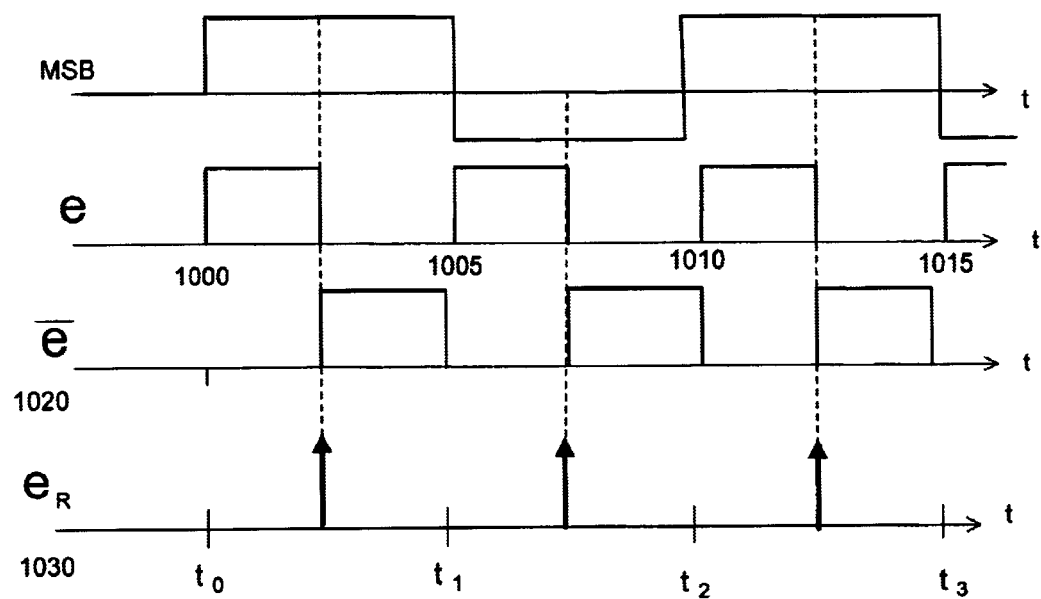
FIG. 10 is an example timing chart of symbol and e value determinations according to the present invention.

The value output from the transition detector 910 is e, pulse synched with the symbol boundaries. An illustration is provided by FIG. 10. An MSB is illustrated cycling high for a time period $t_1$, low for a time period $t_2$, and back high for time period $t_3$. e is shown pulsing high at each transition (1000, 1005, 1010, and 1015).

The edge detected (e) is then inverted by inverter 915. The inverted edge (e bar 1020) is a signal that pulses high at each symbol center. The e bar 1020 signal is fed to a rising edge true device 925. The rising edge true device, which operates as a dirac delta type function (impulse type function), or one cycle of a fast (fastest) clock cycle, for example, to produce $e_R$ 1030. The verified rising edge value $e_R$ is fed to an N-bin histogram 920, where it is saved. In this embodiment, the center value is adjusted directly, rather than using the edge detection plus ½ a symbol time.

Figure 11A:
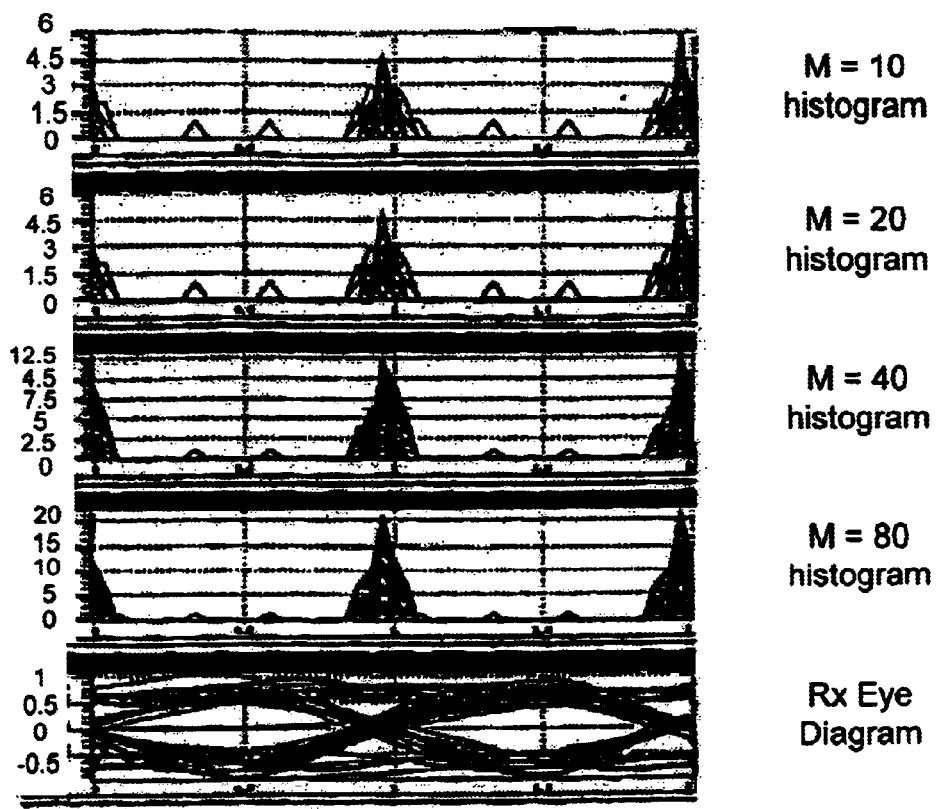
FIG. 11A is a set of histogram plots for varying numbers of symbols (M) developed for an Rx eye diagram.

FIG. 11A is a set of histogram plots for varying numbers of symbols (M) developed for a received signal (see Rx eye diagram). The SNR for the illustrated diagrams is 10 dB. The histogram plots provide an analysis of performance of various embodiments of the present invention. Histogram for each of M=10, 20, 40, and 80 are shown. As can be seen from the diagrams, in general, the edge detections are consistent and provide a reasonable estimate of symbol time. However, the eye diagrams show corresponding better averages with increasing numbers of histograms averaged (note more distinct peaks, at symbol times 1 and 2, for example, and the flattening of non symbol time areas, at approximately 0.25 and 0.75, for example, as the number of symbols increases).

Figure 11B:
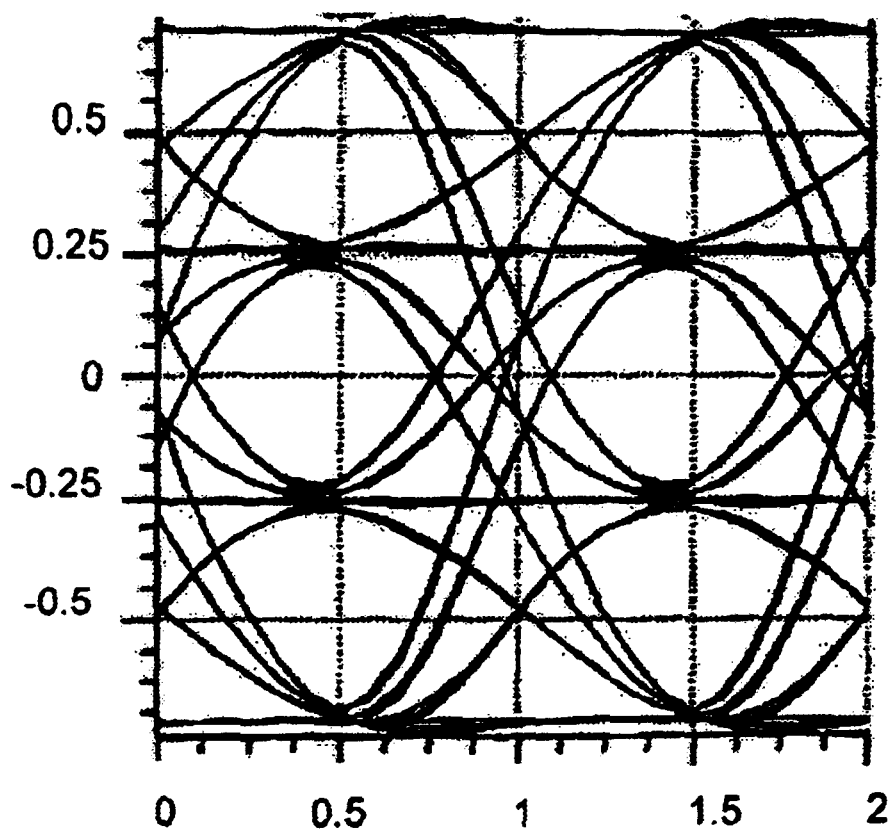
FIG. 11B is a 4 level eye diagram, prior to ADC, using a flex-paging protocol for demonstration purposes.

FIG. 11B is a 4 level eye diagram, prior to ADC, using a flex-paging protocol for demonstration purposes. The present inventors obtained good results using a receiver bandpass filter having 8 kHz bandwidth, and a post detection filter having a 2 kHz bandwidth.

Figure 12:
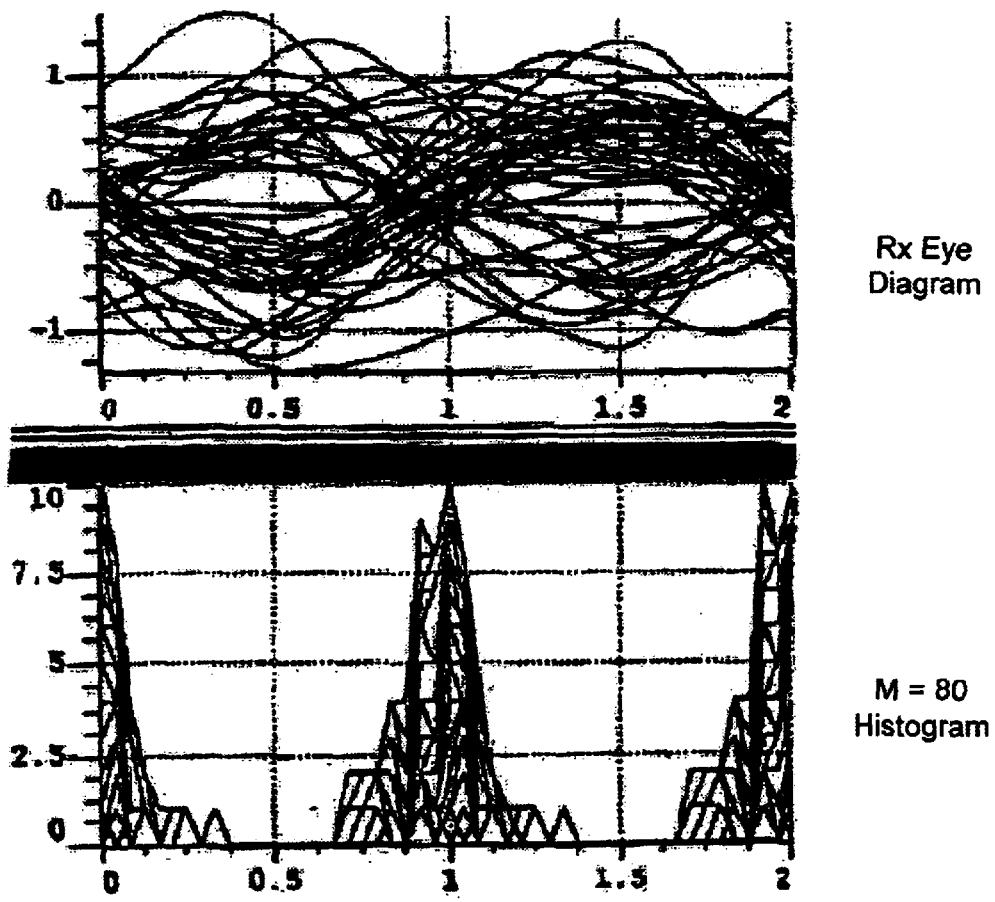
FIG. 12 is a set of receiver Eye diagrams and corresponding histograms for analyzing performance of a rising edge embodiment of the present invention with a low SNR signal.

FIG. 12 is a receiver Eye diagram and corresponding histogram for analyzing performance of a rising edge embodiment of the present invention with edge detection and a low SNR signal. The Rx eye chart shows the received signal, and the M=80 histogram illustrates consistent, symmetrical, symbol times.

Figure 13:
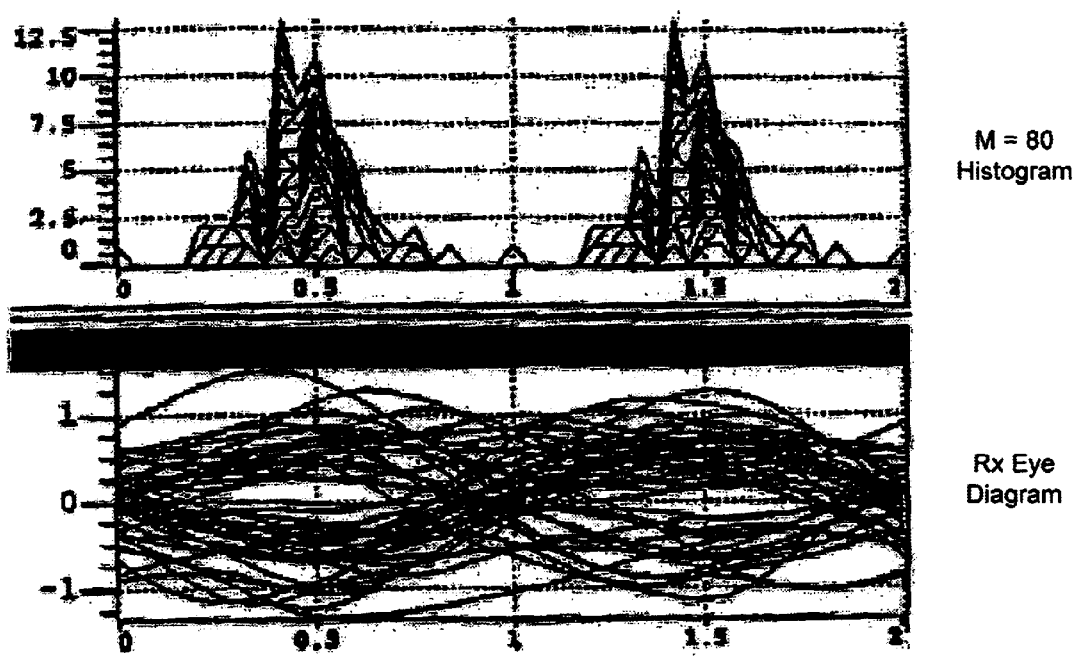
FIG. 13 is a set of receiver Eye diagrams and corresponding histograms for analyzing performance of a center detection embodiment of the present invention with a low SNR signal.

FIG. 13 is a receiver Eye diagram and corresponding histogram for analyzing performance of a center detection embodiment of the present invention with a low SNR signal. Again, the Rx eye chart shows the received signal, and the histogram illustrates consistent, symmetrical, symbol times.

In most cases, system performance is equivalent whether using an edge or center detection embodiment. However, the system has more jitter in it, then the edge detector histogram will be less peaky, more flat. In this case, a system designer would want to go with FIG. 13, center detection, because jitter means there is uncertainty. If you don't have any jitter, then the designer would want to go with the edge detector.

In one embodiment, both center and edge detection is provided, giving the option of choosing one versus the other, depending on what the overall received signal is.

Figure 14:
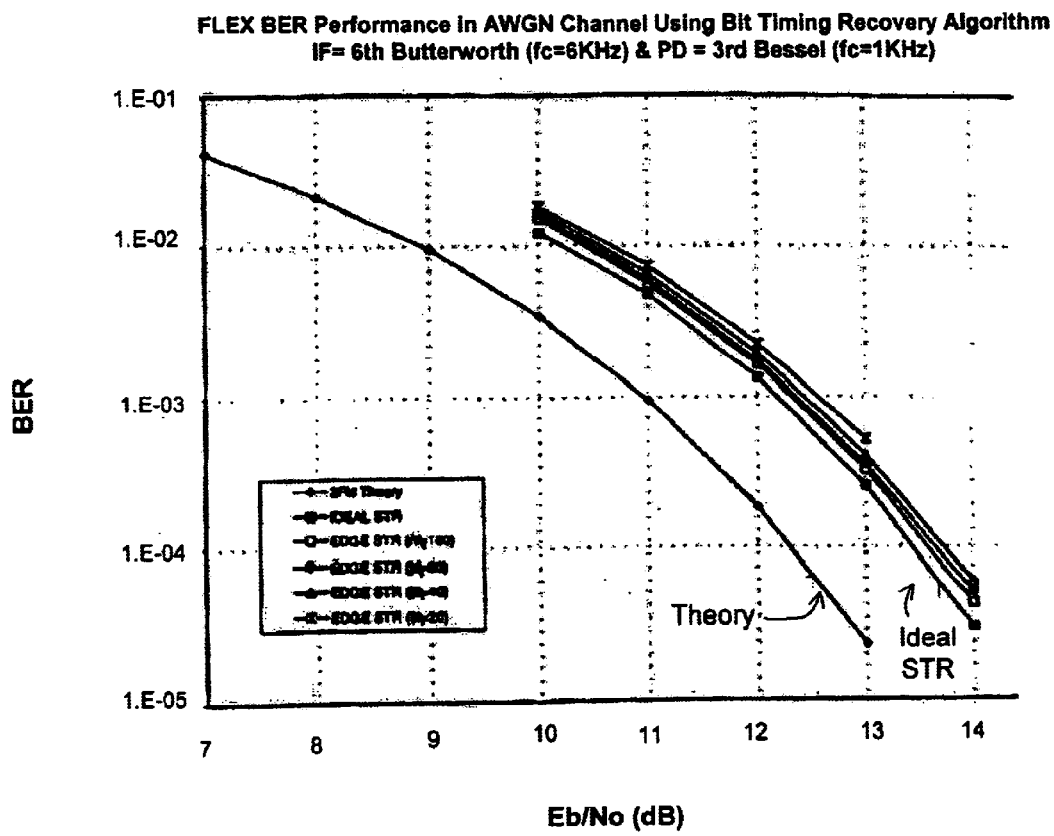
FIG. 14 is a set of graphs illustrating BER vs. Eb/No (dB) performance of various embodiments of the present invention vs. ideal and theory STR's.

FIG. 14 is a set of graphs illustrating BER vs. Eb/No (dB) performance of various embodiments of the present invention vs. ideal and theory STR's. As can be seen in the graph, BER performance for each of N=20, 40, 80, and 160 are grouped in close proximity of an ideal STR. The ideal STR is seen grouped with the N=200 . . . 160 group, and deviated from a Theory STR by approximately 1 dB at each portion of the graph. In an implementation of the invention, the number of histograms considered can be varied depending on any factor (dB required, or available processing power, for example). When additional processing power is available or additional dB needed, M may be set to a higher value (160, for example), but in low dB situations (pilot signal, for example), a lower value such as 20 may be sufficient.

Figure 15:
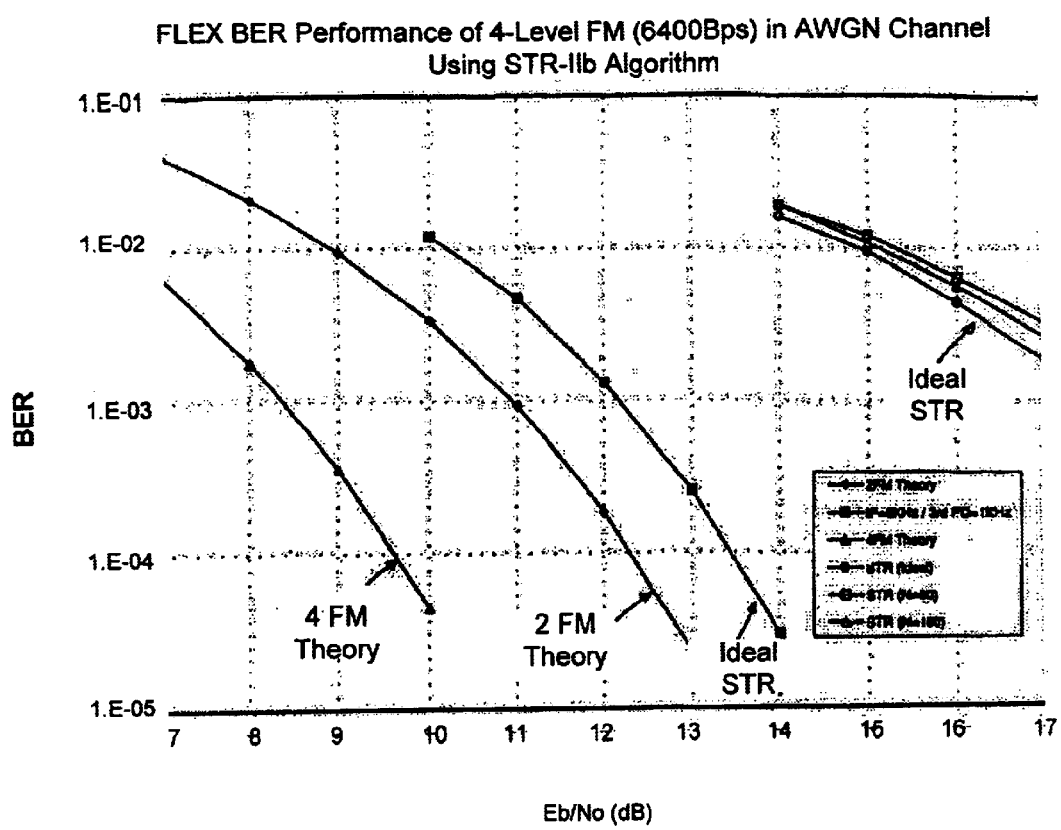
FIG. 15 is a set of graphs illustrating BER vs. Eb/No (dB) performance of various embodiments of the present invention vs. ideal and theory STR's, including 2-FM (binary frequency shift keying) and 4-FM (4 level frequency shift keying) theory.

FIG. 15 is a set of graphs illustrating BER vs. Eb/No (dB) performance of various embodiments of the present invention vs. ideal and theory STR's, including 2-FM and 4-FM theory.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMs, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, comparing consecutive MSB values, maintaining a histogram of signal samples, averaging max eye openings of sample sets, adjusting detection times, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A symbol timing device, comprising:
   an ADC mechanism configured to sample a received signal at a predetermined over-sampling rate;
   a detector connected to said ADC mechanism and configured to detect a symbol identified by at least one of said samples during predetermined symbol times; and
   a symbol timing mechanism connected to said ADC mechanism and said detector and configured to read said samples and adjust a timing of the detection performed by said detector based on previously read samples so that the detected samples are at a most likely maximum eye opening of said samples during said predetermined symbol times;
   wherein:
      said symbol timing mechanism comprises,
         a histogram device configured to,
            store a histogram of said samples over a predetermined number of said symbol times, and
            calculate a most likely max eye opening of said samples of a next symbol time based on said histogram, and
         an adjustment device configured to adjust said timing of the detection performed by said detector based on the calculated most likely max eye opening.

2. The symbol timing device according to claim 1, wherein:
   said over-sampling rate is N; and
   said histogram device comprises,
      a memory configured to store M sets of samples, each sample set comprising N samples, and each sample set corresponding to one of said predetermined symbol times, and
      a calculation mechanism configured to determine said most likely eye-opening of said set of samples of a next symbol time based on the sample sets stored in said histogram.

3. The symbol timing device according to claim 1, wherein said histogram device comprises a calculator configured to calculate said most likely max eye opening by averaging max eye openings of said samples over said predetermined number of symbol times.

4. A symbol timing device, comprising:
   an ADC mechanism configured to sample a received signal at a predetermined over-sampling rate;
   a detector connected to said ADC mechanism and configured to detect a symbol identified by at least one of said samples during predetermined symbol times; and
   a symbol timing mechanism connected to said ADC mechanism and said detector and configured to read said samples and adjust a timing of the detection performed by said detector based on previously read samples so that the detected samples are at a most likely maximum eye opening of said samples during said predetermined symbol times;
   wherein:
      said symbol timing mechanism comprises,
         an edge detector configured to determine an edge of symbols sampled by said ADC mechanism;
         a histogram configured to save samples from said ADC for a predetermined number of previous symbol times; and
         a center adjustment mechanism configured to adjust a sample detected by said detector based on said histogram and edges detected by said edge detector,
         said edge detector comprises,
            a delay mechanism having an input connected to said ADC mechanism, and an output, and
            an exclusive or device having one input connected to said ADC mechanism, a second input connected to the output of said delay mechanism, and an output connected to said histogram; and
         said histogram uses the output of said exclusive or to identify samples maintained in said histogram.

5. A symbol timing device, comprising:
   an ADC mechanism configured to sample a received signal at a predetermined over-sampling rate;
   a detector connected to said ADC mechanism and configured to detect a symbol identified by at least one of said samples during predetermined symbol times; and
   a symbol timing mechanism connected to said ADC mechanism and said detector and configured to read said samples and adjust a timing of the detection performed by said detector based on previously read samples so that the detected samples are at a most likely maximum eye opening of said samples during said predetermined symbol times;
   wherein:
      said symbol timing mechanism comprises,
         a transition detector configured to determine an edge of symbols sampled by said ADC mechanism and output a transition detected signal,
         a conversion mechanism configured to convert the transition detected signal to a pulse synched with a center of symbols corresponding to detected transitions, and
         a histogram that maintains data on a predetermined number M of said pulses;
         said detector is further configured to detect symbols based on the data maintained in said histogram.

6. The symbol timing device according to claim 5, wherein said center adjustment mechanism is further configured to adjust time that said symbol is detected by said detector is based on an average of past pulses.

7. The symbol timing device according to claim 5, wherein said center adjustment mechanism is further configured to adjust time that said symbol is detected by said detector is based on a weighted average of past pulses.

8. The symbol timing device according to claim 5, wherein:
   said conversion mechanism comprises,
      an inverter connected to said transition detector and configured to invert the transition detect signal such that the inverted signal is now synched with a center of a symbol that caused the transition detection and
      a rising edge detect mechanism connected to said inverter and configured to convert the synched signal to a pulse by said rising edge detect mechanism.

9. A method of symbol timing recovery, comprising the steps of:
   sampling a received signal at a predetermined over-sampling rate;
   determining a timing for detection of a specific one or set of said samples based on historical data of previous to said specific one or set of samples;

detecting said specific one or set of samples based on the determined timing; and maintaining a histogram of sample sets, each set comprising a predetermined number of samples for each of a predetermined number of symbol times;

wherein said step of determining a timing comprises the steps of, averaging a max eye opening of each set of samples maintained in said histogram, and calculating a most likely max eye opening for a next set of samples based on the average max eye opening.

10. The method according to claim 9, wherein said step of averaging comprises performing a weighted average of said max eye openings of each set of samples maintained in said histogram.

11. A method of symbol timing recovery, comprising the steps of:

sampling a received signal at a predetermined over-sampling rate;

determining a timing for detection of a specific one or set of said samples based on historical data of previous to said specific one or set of samples;

detecting said specific one or set of samples based on the determined timing; and maintaining a histogram comprising a running average of timing of a max eye opening of samples for each of a predetermined number of symbol times;

wherein said step of determining a timing for detection of a symbol comprises using the running average.

12. A method of symbol timing recovery, comprising the steps of:

sampling a received signal at a predetermined over-sampling rate;

determining a timing for detection of a specific one or set of said samples based on historical data of previous to said specific one or set of samples;

detecting said specific one or set of samples based on the determined timing; and maintaining a histogram indicating timings from an edge detection to max eye opening of the sampled signal during past symbol times;

averaging the timings of past symbol time max eye openings; and detecting an edge of a symbol contained in the current sampled signal;

wherein said step of determining a timing comprises, applying the averaged past symbol max eye opening timing to a timing of the detected symbol edge of the current sampled signal.

13. The method according to claim 12, wherein said step of detecting an edge comprises the steps of:

delaying the received signal by one symbol time;

comparing a currently received signal and the delayed signal; and signaling an edge detection if the compared signals are at different logic levels.

14. The method according to claim 12, further comprising the steps of:

inverting the detected edge so that the rising edge of the inverted signal corresponds to a center of a symbol time of the symbol for which the edge was detected;

converting the inverted signal into a pulse; and wherein:

said step of determining a timing comprises applying each pulse as a timing for detecting said specific one or set of said samples.

15. The method according to claim 14, further comprising the step of:

adjusting a timing of said pulse based on data contained in said histogram.

16. The method according to claim 9, wherein:

said method is embodied in a set of computer instructions stored by a computer readable media;

said computer instructions, when loaded into a computer, cause the computer to perform the steps of said method.

17. The method according to claim 16, wherein said computer instructions are compiled computer instructions stored as an executable program by said computer readable media.

18. A symbol timing device, comprising:

an ADC device configured to detect a received signal at a predetermined over-sampling rate;

a detection device configured to detect a symbol identified by at least one of said samples during a predetermined symbol time; and a symbol timing mechanism configured to read said samples and adjust a timing of the detection performed by the detection device based on previously read samples so that the detected samples are at a most likely maximum eye opening of said samples;

wherein:

said symbol timing mechanism comprises, a histogram device configured to store sets of said samples in a histogram and determine a most likely max eye opening of said samples based on an average max eye opening in each of the sample sets in said histogram, and an adjustment device configured to adjust said timing of the detection performed by the detection device based on said histogram device determined most likely max eye opening.

19. A method of symbol timing recovery, comprising the steps of:

sampling a received signal at a predetermined over-sampling rate;

determining a timing for detection of a specific one or set of said samples at a most likely maximum eye opening based on historical data previous to said specific one or set of samples;

detecting said specific one or set of samples based on the determined timing; and adjusting said timing based on newly acquired samples;

wherein:

said method is embodied in a set of computer readable instructions stored in an electronic signal;

the historical data comprises a plurality of sets of said samples; and said step of determining comprises an average max eye opening in each of the plurality of sample sets and using the average max eye opening as the most likely maximum eye opening.

* * * * *